Figure 1:
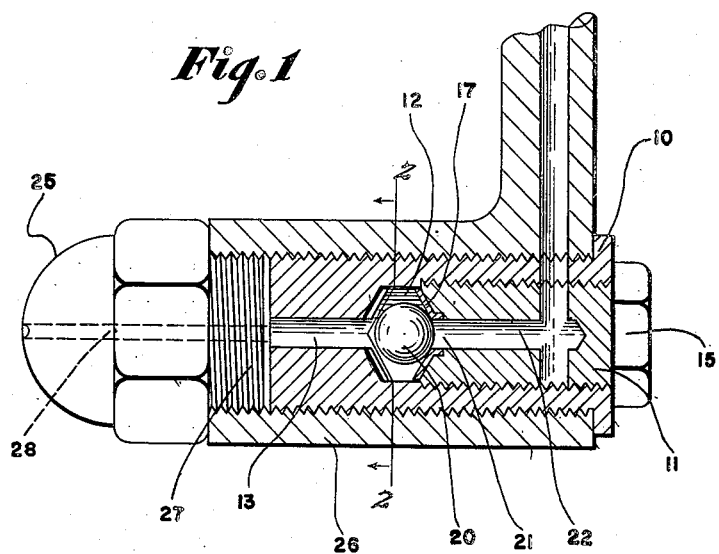

May 27, 1952   I. T. ROSENLUND   2,597,952
VALVE CONSTRUCTION
Filed Sept. 2, 1947

INVENTOR.
Iver T. Rosenlund
BY Watson, Cole, Grindle
& Watson,
ATTORNEYS

Patented May 27, 1952

2,597,952

UNITED STATES PATENT OFFICE 2,597,952

VALVE CONSTRUCTION

Iver Theodore Rosenlund, Newark, Del., assignor to Packard Motor Car Company, Detroit, Mich., a corporation of Michigan Application September 2, 1947, Serial No. 771,730

1 Claim. (Cl. 137—139)

The simple check valve most commonly employed for insuring that the direction of flow of fluid through a conduit may not be inadvertently reversed comprises a body through which the conduit extends and which is provided with a valve seat encircling the port at the discharge end of that conduit, together with a valve and a spring, the spring acting on the valve in such manner as to maintain it in seated position until the pressure of the liquid against the valve overcomes the action of the spring, whereupon fluid flows from the discharge port of the liquid conduit and continues to flow until the liquid pressure falls off and the spring is again able to move the valve to seated position.

The present invention comprises an improvement upon check valves of this general nature having a number of features of novelty which render it more reliable in long continued use and also more compact, simpler, and lighter than earlier types of check valves. In accordance with the invention the use of springs or other resilient devices is dispensed with and there is employed, for the purpose of maintaining the valve normally seated, a permanent magnet. This permanent magnet is of such character as to maintain the associated valve firmly upon its seat unless and until the valve is unseated owing to a substantial increase in pressure of the fluid in the fluid conduit which the valve normally closes. Unseating of the valve under the influence of fluid pressure results in its movement away from the permanent magnet to the extent necessary to permit escape of liquid from the duct but this movement is not so great that the valve passes out of the field of the permanent magnet. Other portions of the valve assembly, adjacent the valve proper, are fabricated of non-magnetic material in order that the relationship between the valve and the permanent magnet provided for the purpose of maintaining it normally seated may not be disturbed.

Preferably the permanent magnet is provided with a facing layer of non-magnetic material which encircles the discharge port of the fluid duct, the valve making contact with such non-magnetic layer instead of directly with the magnet. This facing layer is fabricated of non-magnetic material and is preferably so shaped that the movement of any magnetic particles which may come into contact with it toward the bore of fluid conduit in the permanent magnet is facilitated, the facing layer of non-magnetic material for instance having a valve seating surface which is outwardly flaring or frusto-conical so that such particles may be guided inwardly toward the fluid duct as they move along the surface under the influence of the magnet.

Because of its reliability, small size, simplicity and durability in service, the check valve is particularly suitable in use in association with fuel supply systems for internal combustion engines. The valve per se is light in weight and the pull of the permanent magnet is relatively strong so that the valve will remain seated and will function perfectly regardless of the position in which the valve body as a whole may be placed, i. e. whether the valve is below, beside, or above its seating surface. It may be readily and conveniently applied at various places in the fuel supply system of an engine as, for instance, to the fuel nozzle of such an engine, where it will serve to prevent dripping when the engine is not in operation, or when the engine is being started but before the fuel pressure has increased to the point where a satisfactory spray can be projected.

In the accompanying drawings the valve is disclosed in association with the fuel nozzle. That embodiment of the valve which has been selected for illustration is, it will be appreciated, shown by way of example only.

Figure 2:
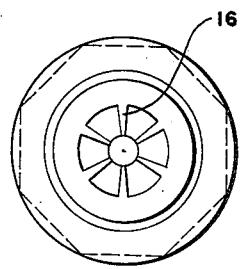

In the drawings:

Figure 1 is a longitudinal or axial section through the improved check valve, a portion of the fuel nozzle with which it has been illustrated being also shown in axial section; and Figure 2 is a section on line 2—2 of Figure 1.

The body of the check valve selected for illustration includes two portions, the outer body member 10 and the inner body member 11. The outer body member is generally cylindrical, is fabricated of non-magnetic material, and has an axial recess 12 extending into the same from one end surface, this recess communicating with an axial bore 13 of reduced diameter which comprises a fuel delivery duct. Within the recess 12 is located the inner body member or permanent magnet 11 previously referred to, these members having threaded relation and the magnetic core member 11 being provided with a head portion 15 shaped as a nut and by means of which it may be conveniently rotated in originally assembling the parts and which facilitates removal of the magnetic core from time to time as may be necessary for inspection or replacement. The bottom of the recess 12 in the non-magnetic member 10 is frusto-conical as shown, and is provided with a series of radially disposed raised ribs 16.

The inner end of the core 11 is frusto-conical, although tapering in a direction diametrically opposed to the direction of taper of the bottom surface of the recess 12. A facing layer of nonmagnetic material is indicated at 17, this facing layer being frusto-conical and covering and resting upon the frusto-conical face of the inner end of the core 11. It may be fabricated of stainless steel, neoprene or other plastic composition, brass, aluminum, or in fact of any other nonmagnetic material which is sufficiently durable and which will maintain smooth continuous contact with a valve such as the steel ball 20, during the life of the check valve. The facing 17 encircles the discharge port 21 of the fluid duct 22 formed in the permanent magnet, the valve 20 normally occupying the position in which it is shown in Figure 1, making close contact with the seating surface of the facing layer 17 and being maintained in that position by the action of the permanent magnet. If the pressure of the fluid in duct 22 rises sufficiently, however, the ball 20 will be displaced and fluid will flow into the valve chamber intermediate the end of core 11 and the bottom of the chamber 12, thence through the discharge duct 13 in member 10.

It will be observed that the ball valve 20 may not move very far from its seating surface before it comes into contact with one or more of the ribs 16 and these ribs are so located with relation to the seating surface that, when the ball valve has been moved to the limit of its travel away from the seating surface it will still be within the strong field of action of the permanent magnet 11 so as to be automatically restored to port closing position when the pressure of the liquid in duct 22 falls. The members 10 and 11 thus define a valve chamber which is of such size and dimension as to permit the necessary movement of the valve under the influence of fluid pressure but at all times so confines the valve that it is subject to the influence of the magnet, the ribs 16, of course, insuring that fluid may flow from the valve chamber into the duct 13 when the valve is unseated, preventing seating of the valve against the bottom of the recess 12 and closing of the delivery duct.

The check valve is shown in association with a fuel nozzle and this nozzle comprises essentially the tip or discharge portion 25 and a sleeve 26, the cylindrical end 27 of the tip 25, which is of reduced diameter, being threaded and being received within the threaded end of the sleeve. Tip and sleeve are preferably of non-magnetic material. The outer member 10 of the valve body is threaded into the sleeve 26, its inner end closely engaging or being positioned close to the end of the reduced portion 27 of the tip and the duct 13 of the valve body registering with duct 28 of the tip.

It will be appreciated that the improved check valve can be associated with other types of fuel distributing appliances and may otherwise be advantageously employed.

Having thus described the invention, what is claimed as new and desired to be secured by Letters Patent is:

A check valve for multi-directional positioning comprising, in combination, a valve body having a valve chamber and inlet and outlet fluid ducts formed therein, one of said ducts terminating in a port in the wall of said chamber, a frusto-conical surface of the chamber wall encircling said port and comprising a seating surface for a valve, a portion of said body in rear of said seating surface comprising a permanent magnet, the remainder of said body being of nonmagnetic material, a ball valve element within said chamber adapted to engage said valve seat and close said port, said valve element being made of material which is attracted by said magnet and being maintained thereby firmly in seated position until displaced by fluid forced through said port, and abutment means in said valve body for confining the movements of the valve element to the field of attraction of the magnet, said field being of sufficient strength to return the ball valve to its seat in the absence of valve-displacing fluid pressure whatever the position of the valve body, while permitting flow of fluid through said valve chamber and the other of said ducts beyond the valve element, said frusto-conical seating surface being comprised of an outwardly flaring relatively thin layer of nonmagnetic material, the permanently magnetized portion of the valve body directly underlying said layer, said frusto-conical seating surface tapering toward said port so as to guide any magnetically attractable particles over said seating surface and into said duct.

IVER THEODORE ROSENLUND.

REFERENCES CITED

The following references are of record in the file of this patent:

UNITED STATES PATENTS

| Number | Name | Date |
|---|---|---|
| 685,549 | Wurts | Oct. 29, 1901 |
| 912,576 | Kelley | Feb. 16, 1909 |
| 1,319,787 | Moran | Oct. 28, 1919 |
| 2,250,813 | Rea | July 29, 1941 |
| 2,294,568 | Neilson | Sept. 1, 1942 |
| 2,313,564 | Manly | Mar. 9, 1943 |
| 2,374,895 | Ray | May 1, 1945 |
| 2,400,817 | Fox | May 21, 1946 |
| 2,405,127 | Beach | Aug. 6, 1946 |

FOREIGN PATENTS

| Number | Country | Date |
|---|---|---|
| 74,521 | Austria | of 1917 |
| 439,138 | Great Britain | of 1935 |